Patented Apr. 30, 1929.

1,711,165

UNITED STATES PATENT OFFICE.

ROGER ADAMS, OF URBANA, ILLINOIS, ASSIGNOR TO THE NEWPORT COMPANY, A CORPORATION OF DELAWARE.

1-METHYL-2,4-DIHALOGEN ANTHRAQUINONE AND PROCESS OF MAKING THE SAME.

No Drawing. Application filed April 25, 1927, Serial No. 186,584. Renewed October 15, 1928.

This process relates to 1-methyl-2,4-dihalogen anthraquinones and to a process for making the same.

It is an object of this invention to provide a simple and economically practicable method for making 1-methyl-2,4-dihalogen anthraquinones which are of themselves valuable intermediates in the preparation of dyestuffs.

Other and further aspects of this invention will be apparent from the disclosures in the specification and appended claims.

I have discovered that 2′,4′-dichloro-5′-methyl-ortho-benzoyl-benzoic acid, which has been described in my co-pending application, Serial No. 179,193, filed March 28, 1927, under certain conditions loses one molecule of water and closes the ring to form 1-methyl-2,4-dichloro-anthraquinone. This reaction is probably best expressed by the following chemical equation in which X represents a halogen atom, such as chlorine or bromine;

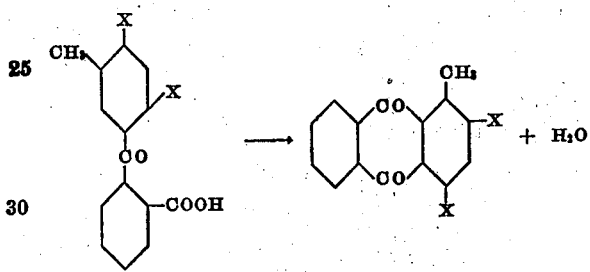

The elimination of water from 2′,4′-dihalogen 5′-methyl-ortho-benzoyl-benzoic acid may be brought about by suitable dehydrating agents such as sulphuric acid or sulphuric acid and boric acid. The fact that this reaction proceeds so smoothly is quite unexpected in view of the tendency in similar compounds for the chlorine group assuming the 4 position in the anthraquinone body formed to hydrolyze. It has been found that hydrolysis of the chlorine does not take place if the conditions of time and temperature are suitably controlled.

1-methyl-2,4-dichloro-anthraquinone is a yellow crystalline solid giving all the typical reactions of an anthraquinone of this type. After repeated crystallizations of the compound from chloroform, I obtained a constant melting point of 155° C.

Without limiting my invention to any particular procedure, the following examples, will serve to illustrate my invention in the preferred form:

*Example 1. 1-methyl-2,4-dichloro-anthraquinone.*

20 parts of 2′,4′-dichloro-5′-methyl-ortho-benzoyl-benzoic acid are dissolved in 700 parts of sulphuric acid (monohydrate) and 4 parts of boric acid. This solution is heated to 100° C. and held at this temperature for two hours. The reaction product is poured into 4000 parts of cold water. The precipitate is filtered and washed with cold water till practically free of mineral acid. It is then dried in vacuum at 100° C. The yield is substantially equal to that theoretically expected. The melting point on the purified product is 155° C.

*Example 2. 1-methyl-2,4-dibromo-anthraquinone.*

The preparation of 1-methyl-2,4-dibromoanthraquinone may be carried out following the procedure in Example 1, except that molecular proportions of 2′,4′-dibromo-5′-methyl-ortho-benzoyl-benzoic acid are employed in place of the corresponding dichloro compound.

I am aware that many changes may be made and numerous details of the process may be varied through a wide range without departing from the principles of this invention, and I therefore do not purpose limiting the patent granted hereon, otherwise than necessitated by the prior art.

I claim as my invention:

1. The process of preparing 1-methyl-2,4-dihalogen anthraquinones, which comprises treating 2′,4′-dihalogen-5′-methyl-orthobenzoyl-benzoic acid at a temperature of about 100° C. with sulphuric acid as dehydrating agent.

2. The process of preparing 1-methyl-2,4-dichloro anthraquinone, which comprises treating 2′,4′-dichloro-5′-methyl-ortho-benzoyl-benzoic acid with a mixture of sulphuric acid and boric acid at a temperature of about 100° C. as dehydrating agent.

3. The process of preparing 1-methyl-2,4-dichloro-anthraquinone, which comprises treating 2′,4′-dichloro-5′-methyl-ortho-benzoyl-benzoic acid with sulphuric acid monohydrate and boric acid to a temperature of 100° C., holding at that temperature for approximately two hours, and diluting the mass with water to precipitate out the 1-methyl-2,4-dichloro-anthraquinone.

4. As new articles of manufacture, 1-methyl-2,4-dihalogen anthraquinones, having most probably the following chemical formula, in which $x$ represents a halogen atom;

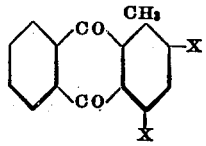

5. As a new article of manufacture, 1-methyl-2,4-dichloro-anthraquinone, having, most probably, the following chemical formula:

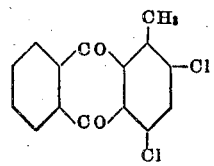

In testimony whereof I have hereunto subscribed my name at Urbana, Champaign, County, Illinois.

ROGER ADAMS.